Patented Oct. 10, 1939

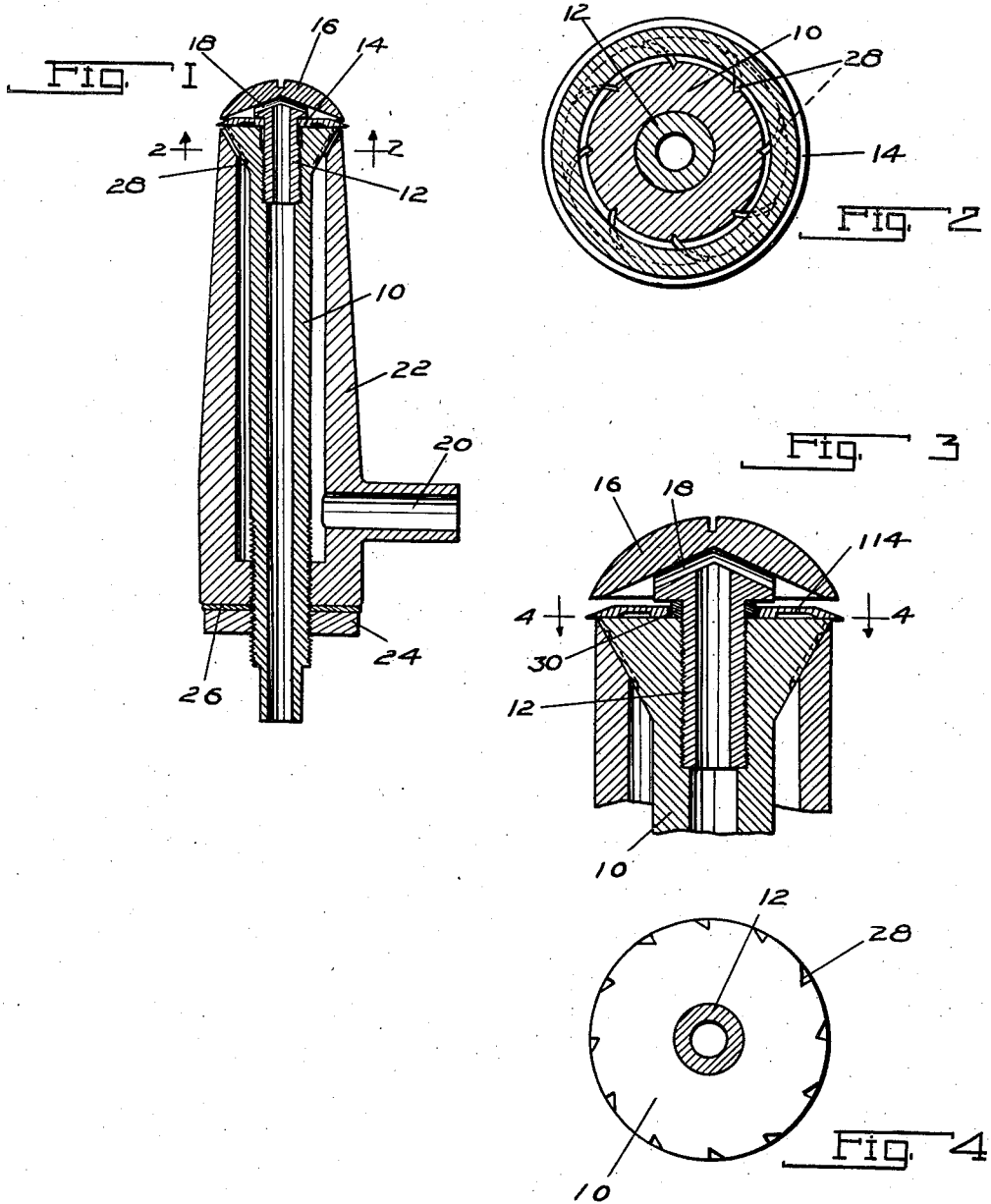

2,175,310

UNITED STATES PATENT OFFICE 2,175,310

BURNER

George W. Pontius, Jr., South Bend, Ind., assignor to International Engineering Corporation, Chicago, Ill., a corporation of Illinois Application April 29, 1936, Serial No. 76,971

5 Claims. (Cl. 299—142)

This invention relates to liquid fuel burners, and is illustrated as embodied in the fuel and air feeding means of an oil burner.

An object of the invention is to provide effective and simple means for thoroughly atomizing and vaporizing the fuel and carbureting the air therewith. An important feature relates to causing the desired carburetion by flowing the fuel radially outward over one surface of a member which terminates in a sharp edge, and picking it up in an air current directed by the opposite surface of said member across the edge over which the fuel is flowing.

In one arrangement, the two surfaces are the upper and lower preferably conical faces of a member shown as shaped like a convex lens, adapted to be mounted on the end of a fuel conduit and arranged to deliver the fuel through an opening in said member onto the upper surface. I prefer to mount over the upper surface a cap having a surface generally paralleling the surface over which the fuel is flowing. The air may be directed in the desired manner over the lower surface by means such as an air box surrounding the fuel conduit, and the edge of which approaches the lower face of the lens-shaped member to leave an annular air passage.

In another desirable arrangement, the fuel may be guided by flowing over one face of a separate plate. In this arrangement, if desired, additional effectiveness may be secured by mounting the plate rotatably, and directing the air current (for example in a plurality of spiral streams) in such a manner as to spin the plate about its axis, thereby acting centrifugally to throw the fuel across the edge of the plate into the whirling current of air.

The above and other objects and features of the invention, including various novel combinations of parts and desirable particular constructions, will be apparent from the following description of the illustrative embodiments shown in the accompanying drawing, in which:

Figure 1 is an axial section longitudinally through the fuel and air mixing means of one form of burner;

Figure 2 is a transverse section therethrough on the line 2—2 of Figure 1;

Figure 3 is a partial longitudinal section through an alternative construction; and Figure 4 is a transverse section therethrough on the line 4—4 of Figure 3.

The burner illustrated in Figures 1 and 2 comprises a fuel conduit 10, through which fuel is fed under a low pressure, and into the end of which is screwed an axially-apertured fitting 12 shouldered to clamp between itself and the end of the conduit 10 a fuel guide such as a plate 14 mounted on the fitting 12. The end of the fitting 12 is formed as an integral cap 16 overhanging the plate 14, fuel passages 18 being drilled to direct the fuel downwardly and radially onto the upper surface of the plate 14. The margin of the plate 14 is beveled conically downward to present a sharp peripheral edge over which the fuel flows.

Air under pressure is delivered by a suitable conduit (not shown) connected to a nipple 20 of an air box 22 threaded onto the fuel conduit 10 and held by a clamp nut 24 provided with a packing washer 26. The upper edge of the wall of the air box 22 is beveled to present a conical surface mating with a corresponding conical lower surface on the flared upper end of the fuel conduit 10. Either or both of these mating conical surfaces is formed with spiral (i. e. outwardly and tangentially directed) passages 28 which direct the air current in a plurality of whirling streams across the bottom margin of disk 14, and outwardly across the above-described sharp edge, to take up the fuel as it flows over the edge.

The arrangement of Figures 3 and 4 differs from that just described, in that a disk 114, arranged generally as described for the disk 14, is mounted rotatably instead of fixedly on the fitting 12 (a suitable bearing bushing 30 being provided if desired), and is given a whirling motion by the tangential force of the spiral air streams, thereby acting centrifugally on the fuel to throw it across the edge of the disk into the whirling current of air.

While several illustrative embodiments have been described in detail, it is not my intention to limit the scope of my invention to those particular embodiments, or otherwise than by the terms of the appended claims.

The present application is a partial continuation of application No. 57,114, filed January 2, 1936.

I claim:

1. A liquid fuel burner comprising a device having a conical surface terminating in a sharp edge and having associated therewith means for discharging fuel on said surface to flow over said edge, and means for directing a stream of air spirally across said edge to take up the fuel flowing over the edge.

2. A liquid fuel burner comprising a device having an upper surface terminating in a sharp edge and having associated therewith means for discharging fuel on said surface to flow over said edge, said device having another surface cooperating with the upper surface to define said sharp edge, and means for directing a stream of air spirally outward over said other surface across said edge to take up the fuel flowing over the edge.

3. A liquid fuel burner comprising a device having a rotatably-mounted plate formed with an opening therethrough, means for feeding fuel through said opening onto one surface of the plate, and means for forcing air against the opposite surface of the plate in a manner to be deflected outwardly by the plate to take up the fuel as it flows over the edge of the plate and for rotating the plate to throw the fuel outwardly across said edge into the deflected air stream.

4. A liquid fuel burner comprising a device having a rotatably-mounted member formed with an axial opening therethrough, means for feeding fuel through said opening onto one surface of said member and causing it to flow radially outward over said surface, and means for forcing a current of air against the opposite surface of the plate in a manner to be deflected radially outward to take up the fuel as it flows over the edge of the plate, said plate and said air-forcing means being constructed and arranged to cause rotation of the plate by the action of the air thereon.

5. A liquid fuel burner comprising a device having a rotatably mounted plate, means for delivering fuel onto one surface of said plate to flow radially outward thereover, and means for directing a current of air across the opposite surface of the plate in a manner to take up the fuel flowing over the edge of the plate and to cause rotation of said plate.

GEORGE W. PONTIUS, Jr.